(12) United States Patent
Belleau et al.

(10) Patent No.: US 8,851,785 B1
(45) Date of Patent: Oct. 7, 2014

(54) BALL JOINT

(75) Inventors: Ryan Mark Belleau, St. Catharines (CA); Mike Holierhoek, Grimsby (CA)

(73) Assignee: TRW Automotive U.S. LLC, Livonia, MI (US)

( * ) Notice: Subject to any disclaimer, the term of this patent is extended or adjusted under 35 U.S.C. 154(b) by 424 days.

(21) Appl. No.: 12/619,710

(22) Filed: Nov. 17, 2009

(51) Int. Cl.
*F16C 11/06* (2006.01)

(52) U.S. Cl.
USPC .............. 403/135; 403/76; 403/122; 403/143

(58) Field of Classification Search
USPC .............. 403/114, 115, 135, 142, 143, 76, 77, 403/134, 140, 141
See application file for complete search history.

(56) References Cited

U.S. PATENT DOCUMENTS

| | | | |
|---|---|---|---|
| 590,835 A * | 9/1897 | Harteg et al. .................. 403/115 |
| 2,845,290 A * | 7/1958 | Latzen ............................. 403/75 |
| 2,954,993 A * | 10/1960 | Scheublein, Jr. et al. ...... 403/135 |
| 3,220,755 A | 11/1965 | Gottschald et al. |
| 3,362,735 A * | 1/1968 | Maxeiner ....................... 403/132 |
| 3,381,987 A | 5/1968 | Husen |
| 3,384,396 A * | 5/1968 | Hamilton ....................... 403/126 |
| 3,501,184 A | 3/1970 | Van Winsen et al. |
| 3,561,800 A * | 2/1971 | Hassan .......................... 403/115 |
| 3,613,201 A * | 10/1971 | Herbenar .................. 29/898.051 |
| 3,650,004 A | 3/1972 | Bergstrom |
| 3,843,272 A * | 10/1974 | Jorn .............................. 403/132 |
| 4,003,666 A * | 1/1977 | Gaines et al. ................... 403/36 |
| 4,256,413 A * | 3/1981 | Abe ............................... 403/122 |
| 4,318,627 A * | 3/1982 | Morin ............................ 403/133 |
| 4,712,940 A | 12/1987 | Wood, Jr. |
| 4,714,368 A * | 12/1987 | Sawada et al. ................. 403/132 |
| 4,725,159 A | 2/1988 | Wood, Jr. |
| 4,797,019 A | 1/1989 | Wood, Jr. |
| 4,880,329 A * | 11/1989 | Sakai ............................. 403/134 |
| 5,066,160 A * | 11/1991 | Wood ............................ 403/140 |
| 5,078,531 A | 1/1992 | Sakai et al. |
| 5,152,628 A | 10/1992 | Broszat et al. |
| 5,154,530 A * | 10/1992 | Dresselhouse ................ 403/138 |
| 5,230,580 A | 7/1993 | Henkel |
| 5,284,398 A | 2/1994 | Sakai |
| 5,342,360 A | 8/1994 | Faccioli et al. |
| 5,380,114 A | 1/1995 | Urbach |
| 5,427,395 A | 6/1995 | Urbach |
| 5,564,853 A | 10/1996 | Maughan |
| 5,609,433 A | 3/1997 | Pazdirek et al. |
| 5,641,235 A * | 6/1997 | Maughan et al. ............. 403/135 |

(Continued)

FOREIGN PATENT DOCUMENTS

WO 2007096081 A1 8/2007

*Primary Examiner* — Daniel P Stodola
*Assistant Examiner* — Matthew R McMahon
(74) *Attorney, Agent, or Firm* — MacMillan, Sobanski & Todd, LLC (57) ABSTRACT

An improved ball joint for use in a motor vehicle steering or suspension system includes a ball joint having a housing defining an axis and a chamber having an open end. A bearing is disposed in the chamber. A ball stud having a ball portion is supported within the chamber by the bearing and a stud portion extends outwardly from the open end of the chamber. A retainer having a mounting portion is secured to the housing to retain the bearing in the chamber and an opening is formed therein through which the stud portion extends. The retainer is stamped and has a central portion configured with a dome shaped surface which extends over the open end of the chamber and is shaped complimentary to the ball portion.

11 Claims, 6 Drawing Sheets

(56) References Cited

U.S. PATENT DOCUMENTS

| | | | |
|---|---|---|---|
| 5,678,947 A | 10/1997 | Urbach et al. | |
| 5,697,723 A * | 12/1997 | Wood | 403/135 |
| 5,782,573 A * | 7/1998 | Dorr et al. | 403/135 |
| 5,799,968 A * | 9/1998 | Loeffler | 280/93.511 |
| 5,855,448 A * | 1/1999 | Showalter et al. | 403/134 |
| 5,899,167 A * | 5/1999 | Furman | 116/173 |
| 6,010,271 A | 1/2000 | Jackson et al. | |
| 6,010,272 A | 1/2000 | Littman | |
| 6,039,337 A | 3/2000 | Urbach | |
| 6,042,294 A | 3/2000 | Urbach | |
| 6,076,840 A | 6/2000 | Kincaid et al. | |
| 6,254,114 B1 | 7/2001 | Pulling et al. | |
| 6,488,436 B1 | 12/2002 | Modat | |
| 6,513,818 B1 | 2/2003 | Seuser et al. | |
| 6,527,468 B1 | 3/2003 | Lindquist et al. | |
| 6,726,392 B2 | 4/2004 | El-Haw et al. | |
| 6,773,196 B2 | 8/2004 | Bröker et al. | |
| 6,902,345 B2 | 6/2005 | Kur | |
| 6,935,803 B2 | 8/2005 | Abels et al. | |
| 7,040,833 B2 | 5/2006 | Kondoh | |
| 7,100,881 B2 * | 9/2006 | Worrall | 248/278.1 |
| 7,153,055 B1 * | 12/2006 | Dorr | 403/122 |
| 7,241,070 B2 | 7/2007 | McMurtry | |
| 7,260,878 B2 | 8/2007 | Kondoh | |
| 7,261,487 B2 | 8/2007 | Urbach | |
| 7,357,591 B2 | 4/2008 | Bröker et al. | |
| 7,438,491 B2 * | 10/2008 | Fan | 403/76 |
| 7,771,136 B2 * | 8/2010 | Buhl et al. | 403/142 |
| 7,802,940 B2 * | 9/2010 | Parker | 403/76 |
| 2003/0077114 A1 | 4/2003 | Bröker et al. | |
| 2003/0081989 A1 * | 5/2003 | Kondoh | 403/135 |
| 2004/0047677 A1 * | 3/2004 | Schonhoff et al. | 403/135 |
| 2004/0057781 A1 | 3/2004 | Bohne et al. | |
| 2004/0130932 A1 * | 7/2004 | Ladouceur | 365/154 |
| 2004/0202507 A1 | 10/2004 | Kur | |
| 2005/0105961 A1 * | 5/2005 | Kondoh | 403/122 |
| 2009/0154989 A1 | 6/2009 | Schaumann | |

* cited by examiner

BALL JOINT

BACKGROUND OF THE INVENTION

This invention relates in general to vehicle steering or suspension systems and in particular to an improved ball joint for use in such a motor vehicle steering or suspension system.

A typical motor vehicle steering or suspension system includes a plurality of members, such as control arms, steering knuckles, etc., which are interconnected for relative movement by ball joints. The ball joint typically includes a ball stud with a spherical ball end portion which is disposed in a housing or socket member having a spherical socket. The housing or socket member can be formed as part of the vehicle suspension system member or can be a separate component which is secured thereto. A ball joint bearing member disposed in the housing or socket member receives the ball end and supports the ball end for rotational and pivotal movement.

SUMMARY OF THE INVENTION

This invention relates to an improved ball joint for use in such a motor vehicle steering or suspension system. According to one embodiment, the ball joint includes a housing defining an axis and a chamber having an open end. A bearing is disposed in the chamber. A ball stud having a ball portion is supported within the chamber by the bearing and a stud portion extends outwardly from the open end of the chamber. A retainer having a mounting portion is secured to the housing to retain the bearing in the chamber and an opening is formed therein through which the stud portion extends. The retainer is stamped and has a central portion configured with a dome shaped surface which extends over the open end of the chamber and is shaped complimentary to the ball portion.

According to another embodiment, the ball joint includes a housing defining an axis and a chamber having an open end. A bearing is disposed in the chamber. A ball stud having a ball portion is supported within the chamber by the bearing and a stud portion extends outwardly from the open end of the chamber. A retainer having a mounting portion is secured to the housing to retain the bearing in the chamber and an opening is formed therein through which the stud portion extends. The retainer is stamped and the mounting portion of the retainer includes an outer periphery having a locating feature provided thereon so as to ensure that the retainer is maintained in proper orientation during assembly.

Other advantages of this invention will become apparent to those skilled in the art from the following detailed description of the preferred embodiments, when read in light of the accompanying drawings.

DETAILED DESCRIPTION OF THE INVENTION

Figure 1:
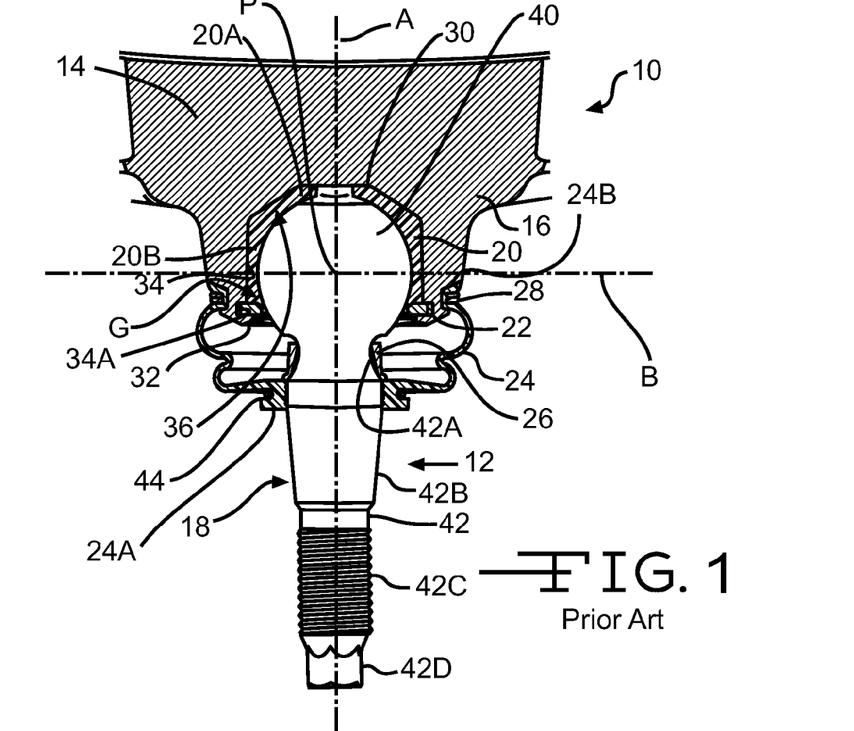
FIG. 1 is a sectional view of a portion of a vehicle suspension member including a prior art ball joint.

Referring now to FIG. 1, there is illustrated a portion of a vehicle suspension system, indicated generally at 10, including a prior art ball joint, indicated generally at 12. The general structure and operation of the vehicle suspension system 10 and the prior art ball joint 12 is conventional in the art. Thus, only those portions of the vehicle suspension system 10 including the prior art ball joint 10 which are necessary for a full understanding of this invention will be explained and illustrated in detail. The prior art ball joint 12 may be used in a variety of applications for interconnecting relatively movable vehicular parts, such as a tie rod or control arm and a wheel knuckle of a vehicle. One of such parts, an upper control arm 14 of the associated vehicle suspension system 10 is illustrated in prior art FIG. 3 in connection with the prior art ball joint 12 shown in FIGS. 1 and 2. As shown in prior art FIG. 3, the upper control arm 14 is connected to a steering knuckle, shown schematically at 13, which in turn is connected to a lower control arm, shown schematically at 15.

Figure 2:
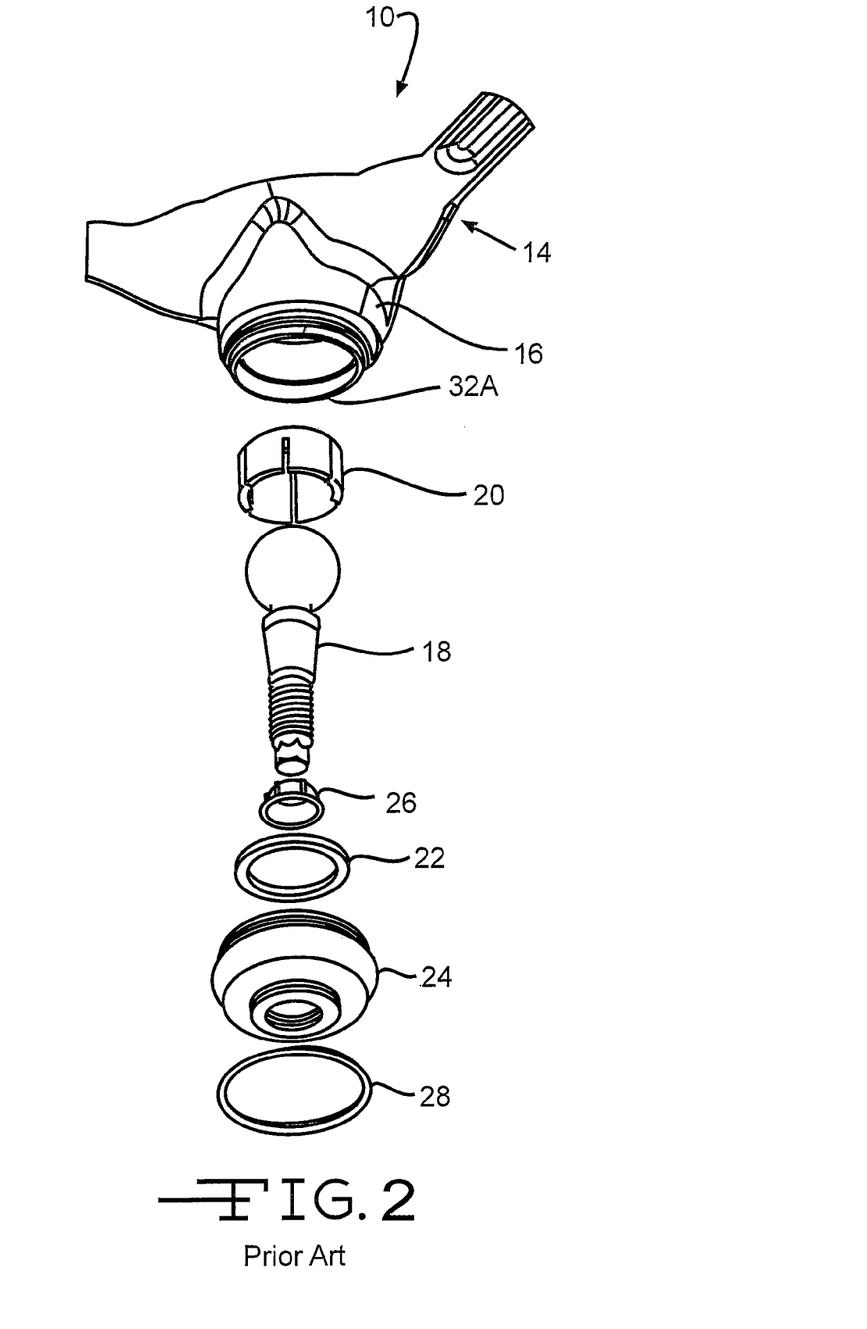
FIG. 2 is an exploded view of the prior art ball joint shown in FIG. 1.
Figure 3:
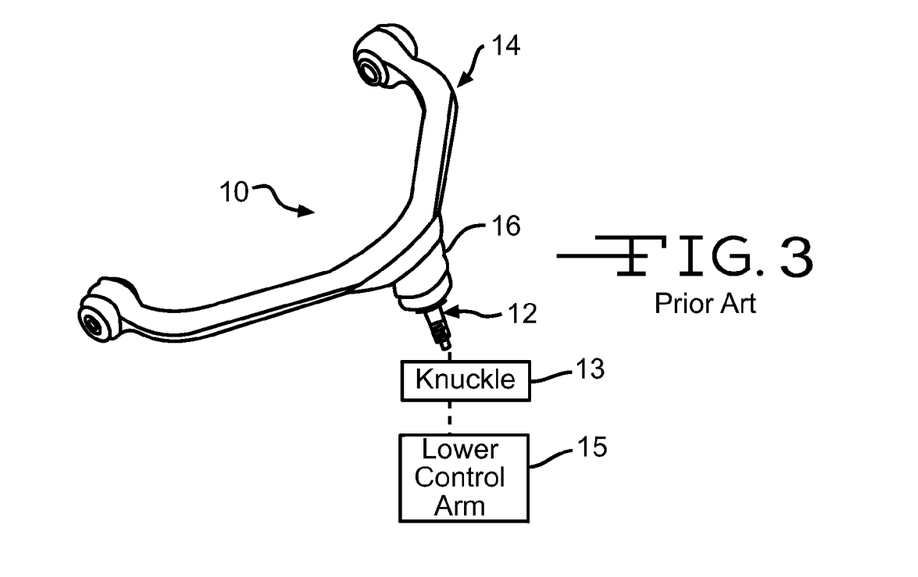
FIG. 3 is a view of an upper control arm of a vehicle suspension system including the prior art ball joint shown in FIGS. 1 and 2.

As shown in prior art FIGS. 1 and 2, the prior art ball joint 10 includes a socket shell or housing 16 which defines an axis A, a ball stud 18, a bearing, 20, a retainer 22, a seal 24, a seal support collar 26, and a seal retaining ring 28. The housing 16, which is illustrated as being formed as part of the upper control arm 14 of the vehicle suspension system 10, includes a first or closed end 30, a second or open end 32, a generally cylindrical side wall 34, and defines a housing chamber, indicated generally at 36.

The ball stud 18 is formed from a suitable material, such as steel, and is centered on the axis A. The ball stud 18 includes a ball portion 40 and a shank portion 42. The central ball portion 40 has a centerline B which extends perpendicular to the axis A. A pivot center P of the ball joint 10 is located on the axis A at the intersection of the axis A and the centerline B. The shank portion 42 of the ball stud 18 includes a first curved section 42A, a second tapered portion 42B, a third externally threaded portion 42C, and a fourth stud end portion 42D.

The shank portion 42 of the ball stud 18 is adapted to be connected to a suitable second vehicle suspension component, such as for example, a steering knuckle (not shown), in a known manner, such as for example, passing the shank portion 42 through an opening provided in the second vehicle suspension component and installing a nut (not shown) onto the externally threaded section 42C of the shank portion 42 and tightening the nut to a predetermined torque.

The bearing 20 in the prior art ball joint 10 is disposed in the housing chamber 36 about the ball portion 40 to support the ball stud 18 for movement about the pivot center P. The bearing 20 is provided with a first lower portion 20A and a second segmented cylindrical side wall portion 20B.

The retainer 22 is generally a flat ring or washer formed from a suitable material, such as for example, steel. The retainer 22 is disposed in an annular groove or recess 34A provided in the side wall 34 of the housing 16 and is operative to retain the bearing 20, and therefore the ball stud 18, within the housing 16. To accomplish this, as is known in the art, after the associated components of the ball joint 12 are assembled in the housing 16, the material of the second end 32 of the housing 16 is rolled over, crimped over, or otherwise deformed (from the initial non-deformed position shown in prior art FIG. 2 at 32A to the finish deformed position shown in prior art FIG. 1 at 32), so as to engage and lie against the retainer 22 to thereby secure bearing 20, and therefore the ball joint 12, to the housing 16. As is known in the art, during normal vehicle operation, there is a gap or clearance, indicated generally by G, between the retainer 22 and the adjacent surface of the ball portion 40 of the ball stud 18 to prevent metal to metal contact between the two components and to provide for the proper articulation of the ball stud 18 of the ball joint 12 within the housing 16.

The boot seal 24 is formed from a suitable elastomeric material, such as for example, polyurethane or neoprene. The boot seal 24 includes a first end 24A which is disposed about the second end 32 of the housing 16 and a second end 24B which is disposed about the shank portion 42 of the ball stud 18. As shown in prior art FIG. 1, the seal support collar 26 is disposed about the first portion 42A of the shank portion 18 to support the second end 24B of the boot seal 24 and the seal retaining ring 28 is disposed about the first end 24A of the boot seal 24 to retain the boot seal 24 to the housing 16. Also, as shown in prior art FIG. 1, a retaining ring 44 is provided to secure the second end 24B of the boot seal 24 about the shank portion 42 of the ball stud 18. The structure and operation of the prior art ball joint 12 thus far described is conventional in the art.

Figure 4:
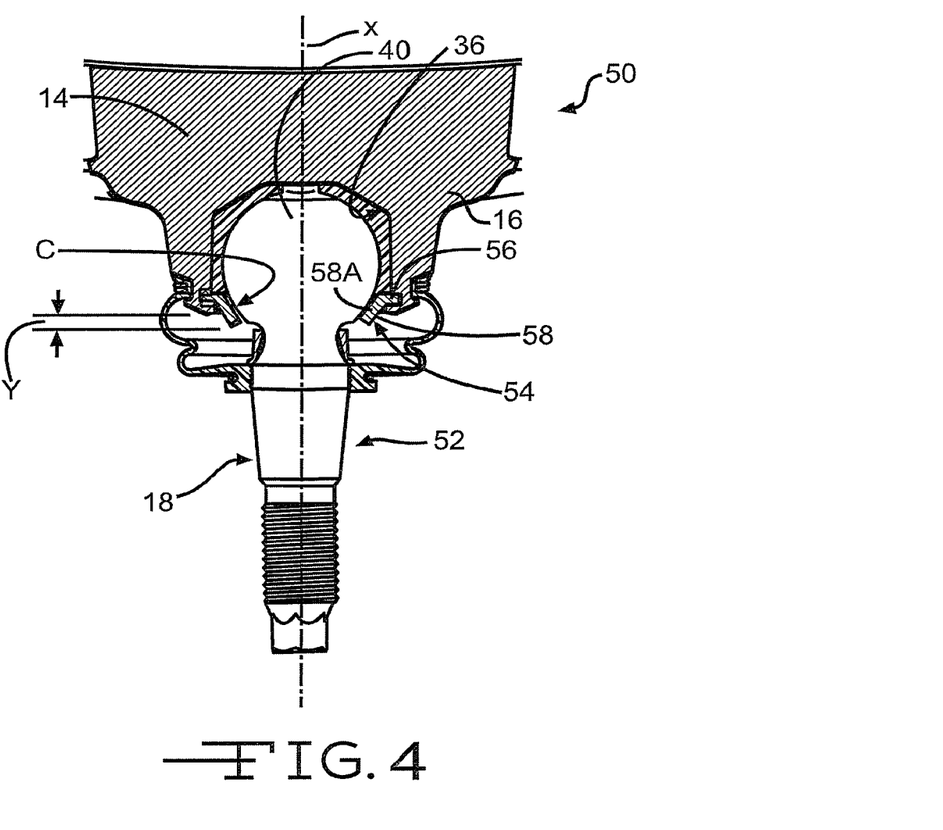
FIG. 4 is a sectional view of a portion of a vehicle suspension member including a first embodiment of a ball joint having a first embodiment of a retainer.
Figure 5:
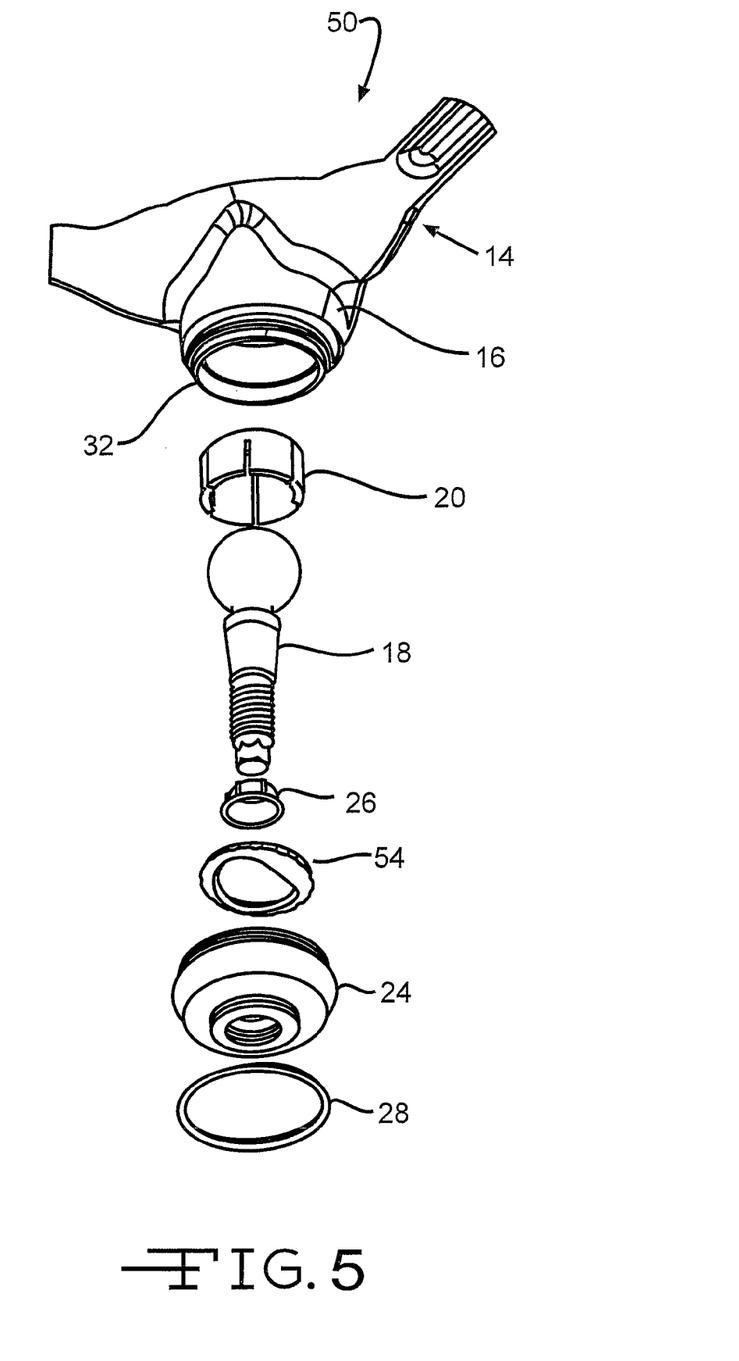
FIG. 5 is an exploded view of the ball joint shown in FIG. 4.

Referring now to FIGS. 4 and 5 and using like reference numbers to indicate corresponding parts, there is illustrated a portion of a vehicle suspension system, indicated generally at 50, including a first embodiment of a ball joint, indicated generally at 52. Although this invention will be described and illustrated below in connection with the particular vehicle suspension member and particular type of ball joint disclosed herein, it will be appreciated that this invention may be used in connection with other vehicle suspension members and/or other types of ball joints.

As shown in this embodiment, the ball joint 52 is generally the same as the prior art ball joint 12 illustrated and described above except that the ball joint 52 includes a retainer 54. In the illustrated embodiment, the retainer 54 is generally a dome retainer formed from a suitable material, such as for example steel, by a stamping process. The retainer 54 includes a first mounting portion 56 and a second generally outwardly extending dome portion 58.

In the illustrated embodiment, the mounting portion 56 is generally flat and extends generally perpendicular to the axis X of the housing 16 and preferably includes an outer periphery 60 provided with locating feature for a purpose to be discussed below. In the illustrated embodiment, the locating feature is a plurality of scallops or cut-outs 60A. In the illustrated embodiment, the scallops 60A are generally rounded or semi-circular in shape and are provided evenly spaced along the outer periphery 60.

Figure 6:
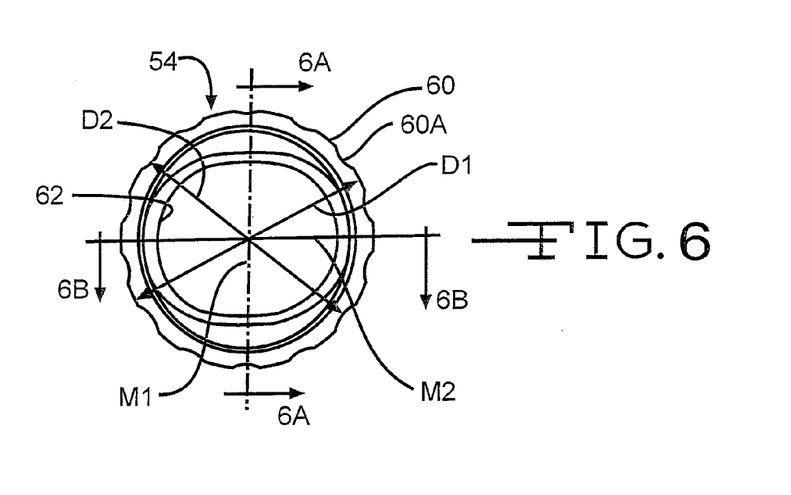
FIG. 6 is a plan view of the retainer of the ball joint shown in FIGS. 4 and 5.

As shown in FIG. 6, the outer periphery 60 of the mounting portion 56 defines a first diameter D1, and the scallops 60A define a second diameter D2 which is less than the first diameter D1. Alternatively, the shape, size, number or arrangement of the scallops 60A may be other than illustrated and described if so desired. Also, other suitable locating features may be used on the mounting portion 56 of the retainer 54. For example, the outer periphery 60 of the mounting portion 56 may be provided with knurls, a gear tooth pattern, or multiple flats if so desired.

The dome portion 58 includes an inner side wall surface 58A which extends over the open end 32 of the housing chamber 36 and is shaped complimentary to the ball portion 40 so as to be disposed adjacent a portion thereof for a purpose to be discussed below. The dome portion 58 is provided with a generally elliptical or oval shaped opening 62. The opening 62 includes an opening side wall 62A which is generally perpendicular to inner side wall surface 58A of the dome portion 58. In the illustrated embodiment, the opening 62 is formed in the center of the retainer 54 and defines a first or minor axis M1 and a second or major M2.

Figure 6A:
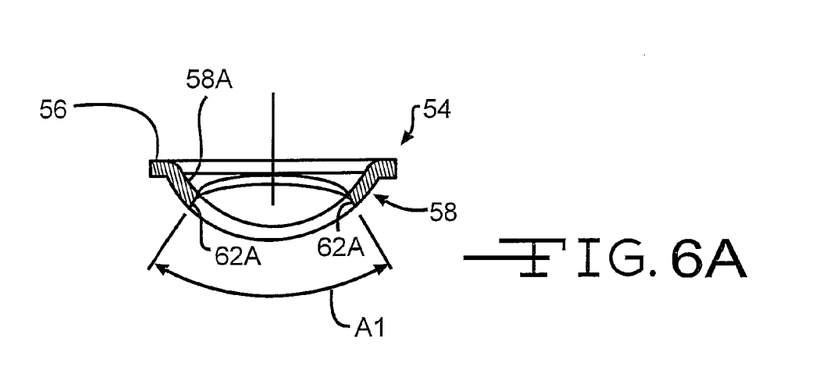
FIG. 6A is a sectional view taken along line A-A of FIG. 6.
Figure 6B:
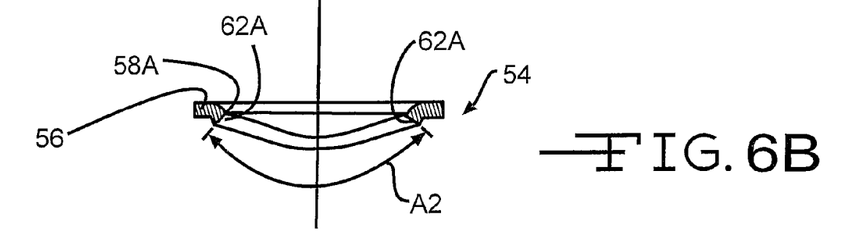
FIG. 6B is a sectional view taken along line B-B of FIG. 6.

As can be seen in FIG. 6A, the opening 62 along the minor axis M1 is preferable provided between the opposed angled side walls 62A which are separated from one another by a first angle A1. As can be seen in FIG. 6B, the opening 62 along the major axis M2 is preferable provided between the opposed angled side walls 62A which are separated from one another by a second angle A2 which is preferably greater that the first angle A1 to provide for improved ball stud 18 articulation yet maximize the containment of the ball stud 18 in the housing 16. In the illustrated embodiment, the first angle A1 is approximately 67 degrees and the second angle A2 is approximately 102 degrees. Alternatively, depending upon particular vehicle applications, the first angle A1 and/or the second angle A2 may be other than illustrated if so desired.

The first angle A1 and the second angle A2 are preferably formed in the retainer 54 by first piercing an opening into a retainer blank (not shown), so that during the doming process the angles A1 and A2 can be formed at the same time as the opening is formed. Alternatively, the retainer blank can be formed into the dome shaped retainer and then the opening can be formed in the retainer. However, if the latter process is used, it may require additional processes if the angles A1 and A2 are to be formed in the retainer.

In the illustrated embodiment, due to the elliptical shape of the opening 62 creating a minor axis M1 and a major axis M2, the orientation of the retainer 54 within the ball joint 52 is important to enable proper articulation of the ball joint 42 during normal vehicle operation. Thus, the scallops 60A around the outer periphery 60 of the retainer 54 are provided to ensure that the retainer 54 is maintained in its proper orientation during the ball joint assembly process. Specifically, during the assembly (roll forming or orbit forming), as the housing material is rolled over the retainer 54 the action of the roll process deforms and deflects the housing material into the scallops 60A to keep the retainer 54 from rotating during assembly. This is important because the minor axis M1 and the major axis M2 of the ball joint 52 needs to be properly oriented in the housing 16 to provide proper articulation of the ball stud 18. Specifically, in the illustrated embodiment, the minor axis M1 is preferably located along the lengthwise axis of the associated vehicle (i.e., front to back), and the major axis M2 is preferably located along the transverse axis of the vehicle (i.e., side to side).

As shown in FIG. 4, the dome portion 58 of the retainer 54 extends generally radially inwardly from the mounting portion 56 toward the axis X of the housing 16. During normal vehicle operation, there is a gap or clearance, indicated generally by C, between an inner side wall surface 58A of the dome portion 58 of the retainer 54 and the adjacent surface of the ball portion 40 of the ball stud 18 to prevent metal to metal contact between the two components and to provide for the proper articulation of the ball stud 18 of the ball joint 52 within the housing 16. In the illustrated embodiment, the dome portion 58 extends out from the housing 16 and past the second open end 32 thereof by a distance Y. As a result of this, the dome portion 58 is disposed adjacent a portion of the ball portion 40 of the ball stud 18 to effectively capture or surround the ball portion 40. Alternatively, the construction of the ball joint 52 may be other than illustrated if so desired. For example, the seal 24 could be an "onion" style neoprene seal (not shown) and/or could be a purgeable style seal (not shown), and the seal support collar 26 and/or the bearing 20 and/or the housing 16 and/or the ball stud 18 may be other than illustrated if so desired.

Figure 7:
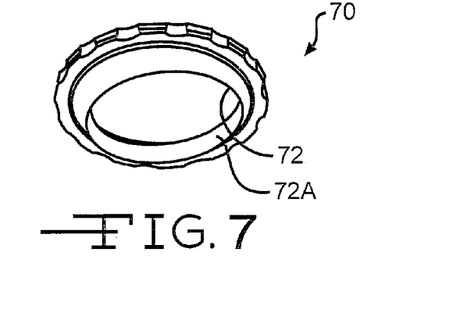
FIG. 7 is a perspective view of an alternate embodiment of a retainer for use in a ball joint.
Figure 8:
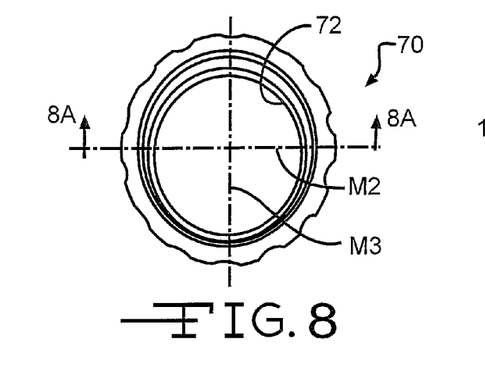
FIG. 8 is a plan view of the retainer shown in FIG. 7.
Figure 8A:
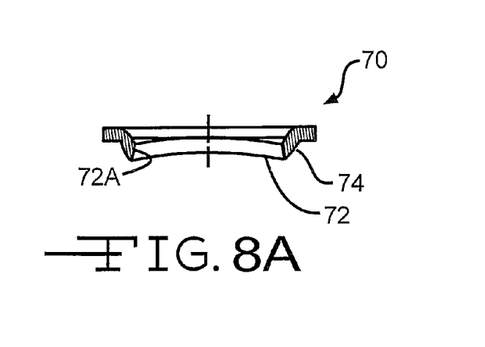
FIG. 8A is a sectional view taken along line A-A of FIG. 8.

Referring now to FIGS. 7, 8 and 8A and using like reference numbers to indicate corresponding parts, there is illustrated an alternate embodiment of a retainer, indicated generally at 70, for use in a ball joint such as the ball joint 18. In this embodiment, the retainer 70 is similar to the retainer 54 illustrated and described above except that the retainer 70 is provided with a generally offset circular opening 72 having an opening side wall 72A which is generally perpendicular to a dome portion 74 thereof. In the illustrated embodiment, the opening 72 is formed offset from the center of the retainer 70 and defines a first or minor axis M2 and a second or major axis M3.

Figure 9:
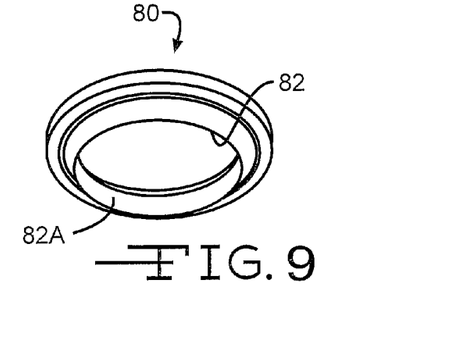
FIG. 9 is a perspective view of another alternate embodiment of a retainer for use in a ball joint.
Figure 10:
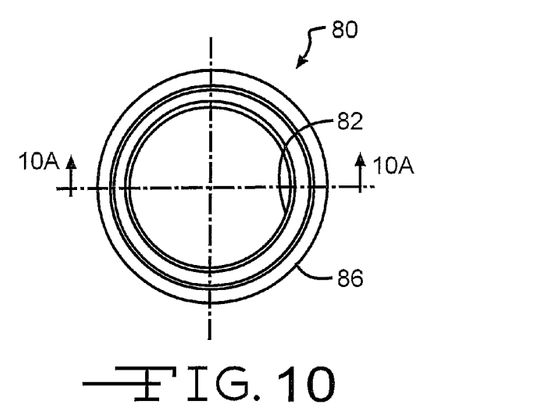
FIG. 10 is a plan view of the retainer shown in FIG. 9.
Figure 10A:
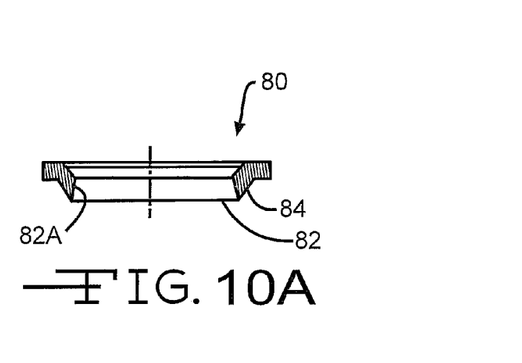
FIG. 10A is a sectional view taken along line A-A of FIG. 10.

Referring now to FIGS. 9, 10 and 10A and using like reference numbers to indicate corresponding parts, there is illustrated another alternate embodiment of a retainer, indicated generally at 80, for use in a ball joint such as the ball joint 18. In this embodiment, the retainer 80 is similar to the retainer 54 illustrated and described above except that the retainer 80 is provided with a centrally located circular opening 82 having an opening side wall 82A which is generally perpendicular to a dome portion 84 thereof and an outer periphery 86 thereof is not provided with any locating means provided thereon, e.g., no scallops, knurls, gear tooth pattern, flats or the like.

One advantage of the illustrated embodiments of the invention is that the dome retainer 54, 70, 80 is effective to more fully capture the ball portion 40 of the ball stud 18, except for the amount of the clearance C in the respective dome portion 54, 74, 84, to allow for the proper articulation of the ball stud 18 of the ball joint 12. This is due to the dome portion 54 of the embodiment of the retainer 52 shown in FIG. 4, for example, being shaped generally complimentary to and extending over the ball portion 40 of the ball stud 18 the distance Y. In the prior art ball joint 12 shown in prior art FIG. 1, the retainer 22 was a flat retainer and did not extend any such similar distance Y.

Although this invention has been described and illustrated below in connection with the particular vehicle suspension member and particular type of ball joint disclosed herein, it will be appreciated that this invention may be used in connection with other vehicle suspension members and/or other types of ball joints. For example, the ball joint embodying the present invention may be used in a variety of applications for interconnecting relatively movable vehicular parts, such as a tie rod or control arm and a wheel knuckle of a vehicle suspension system.

Also, this invention may be used in other types of ball joint constructions, such as for example canister-type ball joints, cross-axis type ball joints, and bottom load type ball joints, and in the following ball joints shown in U.S. Pat. No. 7,261,487 to Urbach, U.S. Pat. No. 6,726,392 to El-Haw et al., U.S. Pat. No. 6,527,468 to Lindquist et al., U.S. Pat. No. 5,678,947 to Urbach et al., and U.S. Pat. No. 5,380,114 to Urbach, the disclosures of each of these patents incorporated herein by reference in entirety.

More generally, this invention may be used in any type of ball joint having a bearing or bearing assembly, made of one or more bearing components, which is held in a housing, which can be formed as part of the associated vehicle suspension member or formed separate therefrom and secured thereto by know methods, by a retainer which is secured to the housing to retain the bearing and therefore the ball portion of the ball joint, to the housing. Further, while the invention has been illustrated in connection with a compression type of ball joint, the invention may be used in connection with a tension style ball joint if so desired.

The principle and mode of operation of this invention have been described in its various embodiments. However, it should be noted that this invention may be practiced otherwise than as specifically illustrated and described without departing from its scope.

What is claimed is:

1. A ball joint comprising: a housing defining an axis and a chamber having an opened end and a closed end; only a single bearing disposed in said chamber; a one-component ball stud having a ball portion having a first ball portion supported within said chamber only by said single bearing and a stud portion extending outwardly from said opened end of said chamber; and a retainer having a mounting portion secured to said housing to retain said bearing in said chamber and an opening formed therein through which said stud portion extends, wherein said mounting portion is disposed in an annular groove provided in an inside side wall of said housing adjacent said opened end thereof;

wherein said retainer only has an additional central portion which extends only in one radial direction relative to the mounting portion, wherein the one radial direction is a direction which extends generally radially inwardly from said mounting portion toward said axis, wherein the central portion is configured with a dome shaped portion which extends over said opened end of said chamber and includes an inner side wall surface shaped complimentary to a second ball portion of said ball portion, wherein said single bearing is disposed only above said mounting portion of said retainer such that no portion of said single bearing is disposed between said dome shaped portion of said retainer and said second ball portion of said ball portion, wherein said mounting portion of said retainer extends only generally perpendicular to said axis and said dome shaped portion of said retainer extends at an angle relative to said axis, wherein said mounting portion of said retainer directly engages said bearing to retain said bearing in said chamber, wherein said second ball portion of said ball portion is not supported by said bearing, and wherein said central portion is disposed in spaced apart contact from said second ball portion of said ball portion by a clearance distance to prevent direct contact between said inner side wall surface of said dome shaped portion of said retainer and an adjacent portion of said ball portion to thereby provide for articulation of said ball stud within said housing;

wherein said mounting portion of said retainer includes an outer periphery having a locating feature provided thereon;

wherein said locating feature is a plurality of scallops;

wherein said locating feature is non-deformable so as to be located in the same plane as said mounting portion of said retainer prior to and following assembly thereof.

2. The ball joint of claim 1 wherein said opening is a circular opening.

3. The ball joint of claim 2 wherein said circular opening is offset with respect to said axis.

4. The ball joint of claim 1 wherein said dome shaped portion extends from within said housing past said opened end thereof.

5. The ball joint of claim 1 wherein said opening of said retainer includes a side wall which extends generally perpendicular to said dome shaped portion.

6. The ball joint of claim 1 wherein said opening is formed in said retainer prior to forming said dome shaped portion.

7. A ball joint comprising:
a housing defining an axis and a chamber having an opened end and a closed end;
only a single bearing disposed in said chamber;
a one-component ball stud having a ball portion having a first ball portion supported within said chamber by said bearing and a stud portion extending outwardly from said opened end of said chamber; and
a retainer having a mounting portion secured to said housing to retain said bearing in said chamber and said retainer having a through opening formed therein through which said stud portion extends, wherein said mounting portion is disposed in an annular groove provided in an inside side wall of said housing adjacent said opened end thereof;
wherein said mounting portion of said retainer includes an outer periphery having a locating feature provided thereon so as to that prevent rotation of said retainer is during assembly, wherein said locating feature is a plurality of scallops provided in said outer periphery of said mounting portion, wherein said bearing is disposed only above said mounting portion of said retainer, wherein said locating feature is non-deformable so as to be located in the same plane as said mounting portion of said retainer prior to and following assembly thereof;
wherein said retainer only has an additional central portion which is configured with a dome shaped portion which extends over said opened end of said chamber and includes an inner side wall surface shaped complimentary to a second ball portion of said ball portion, wherein said single bearing is disposed only above said mounting portion of said retainer such that no portion of said single bearing is disposed between said dome shaped portion of said retainer and said second ball portion of said ball stud, and wherein said mounting portion of said retainer directly engages said bearing to retain said bearing in said chamber;
wherein said second ball portion of said ball portion is not supported by said bearing, and wherein said central portion is disposed in spaced apart contact from said second ball portion of said ball portion by a clearance distance to prevent direct contact between said inner side wall surface of said dome shaped portion of said retainer and an adjacent portion of said ball portion to thereby provide for articulation of said ball stud within said housing.

8. The ball joint of claim 7 wherein said opening is a circular opening.

9. The ball joint of claim 8 wherein said circular opening is offset with respect to said axis.

10. A ball joint comprising:
a housing defining an axis and a chamber having an opened end and a closed end; only a single bearing disposed in said chamber;
a one-component ball stud having a ball portion having a first ball portion and a second ball portion and a stud portion extending outwardly from said opened end of said chamber; and
a retainer having a mounting portion secured to said housing to retain said bearing in said chamber and an opening formed therein through which said stud portion extends, wherein said mounting portion is disposed in an annular groove provided in an inside side wall of said housing adjacent said opened end thereof;
wherein said retainer has a central portion configured with a dome shaped portion which extends over said opened end of said chamber and includes an inner side wall surface shaped complimentary to said second ball portion of said ball portion, wherein only said first ball portion is supported within said chamber by said single bearing, said second ball portion of said ball portion not supported by said single bearing, and wherein said mounting portion of said retainer extends generally only perpendicular to said axis and said dome shaped portion of said retainer extends at an angle relative to said axis, wherein said mounting portion of said retainer directly engages said bearing to retain said bearing in said chamber, wherein said second ball portion of said ball portion is not supported by said bearing, and wherein said central portion is disposed in spaced apart contact from said second ball portion of said ball portion by a clearance distance to prevent direct contact between said inner side wall surface of said dome shaped portion of said retainer and an adjacent portion of said ball portion to thereby provide for articulation of said ball stud within said housing;
wherein said mounting portion of said retainer includes an outer periphery having a locating feature provided thereon;
wherein said locating feature is a plurality of scallops;
wherein said locating feature is non-deformable so as to be located in the same plane as said mounting portion of said retainer prior to and following assembly thereof.

11. The ball joint of claim 10 wherein said opening of said retainer includes a side wall which extends generally perpendicular to said dome shaped portion.

* * * * *

UNITED STATES PATENT AND TRADEMARK OFFICE
CERTIFICATE OF CORRECTION

PATENT NO. : 8,851,785 B1
APPLICATION NO. : 12/619710
DATED : October 7, 2014
INVENTOR(S) : Ryan Mark Belleau and Mike Holierhoek Page 1 of 1

It is certified that error appears in the above-identified patent and that said Letters Patent is hereby corrected as shown below:

In the Claims,

Column 7, Claim 7, Line 28, delete "that";

Column 7, Claim 7, Line 28, delete "is".

Signed and Sealed this
Twenty-seventh Day of January, 2015

Michelle K. Lee
*Deputy Director of the United States Patent and Trademark Office*